United States Patent [19]

Watanabe et al.

[11] Patent Number: 4,682,718
[45] Date of Patent: Jul. 28, 1987

[54] NOZZLE FOR CONTINUOUS CASTING OF MOLTEN STEEL

[75] Inventors: Kuniaki Watanabe; Hideo Suzuki, both of Tokyo, Japan

[73] Assignee: Toshiba Ceramics Co., Ltd., Tokyo, Japan

[21] Appl. No.: 797,369

[22] Filed: Nov. 12, 1985

Related U.S. Application Data

[63] Continuation-in-part of Ser. No. 523,914, Aug. 16, 1983, abandoned.

[51] Int. Cl.$^4$ .................................... B22D 41/08
[52] U.S. Cl. .................... 222/591; 222/606; 264/44
[58] Field of Search .............. 222/591, 606, 607; 501/100, 133; 264/56, 63, 44; 164/337

[56] References Cited

FOREIGN PATENT DOCUMENTS

| 7868 | 1/1982 | Japan | 222/591 |
| 7368 | 1/1982 | Japan | 222/591 |
| 51169 | 3/1982 | Japan | 222/591 |
| 184562 | 11/1982 | Japan | 222/591 |

OTHER PUBLICATIONS

*Development of Alumina-Graphite Immersion Nozzle for Continuous Casting,* Okamoto et al., Iron and Steel Engineer, p. 47, 12/1982.

Primary Examiner—Joseph J. Rolla
Assistant Examiner—Nils E. Pedersen
Attorney, Agent, or Firm—Jordan and Hamburg

[57] ABSTRACT

Silica powder is added to a primary mixture consisting of alumina powder and graphite powder, and is mixed therewith. A binder is added to the resultant secondary mixture and is well mixed therewith. The mixture thus obtained is granulated. The granulated product is placed in a rubber mold, and pressure is applied uniformly thereto to mold it. The molded product is fired but not sintered at a temperature between 850° and 950° C., preferably 900° C., which allows unreacted alumina and silica to remain in the final fired-product. Thus, a nozzle consisting of a fired body having a cavity volume index (the sum of the volume of open and closed pores/the volume of the fired body) of 0.15–0.25 including 6–60% of closed pores therein is manufactured.

8 Claims, 2 Drawing Figures

NOZZLE FOR CONTINUOUS CASTING OF MOLTEN STEEL

This is a continuation-in-part application of Ser. No. 523,914 filed Aug. 16, 1983, now abandoned.

BACKGROUND OF THE INVENTION

Since various kinds of steel contain chemical elements selected in accordance with the use of the steel, refratory parts used for casting the steel, such as a nozzle, can be improved in such a manner that they have a higher chemical stability with respect to the various elements.

A sintered body with a chemical stability which is improved over that of a conventional sintered body must also be so flexible that it can absorb in itself any radial expansion force occurring in the sintered body due to the intense heat applied thereto when it is used, to prevent the sintered body from breaking. In addition, it is necessary that such a sintered body has a sufficient heat-insulating capacity to prevent the molten steel or non-metallic inclusions therein from being deposited on the surface thereof.

Providing a nozzle for steel casting with this chemical stability is very important in improving its corrosion resistance. Improving the chemical stability of a nozzle with a texture which can withstand the high frictional force generated by the molten steel of a high specific gravity, causes the toughness thereof to decrease, so a nozzle with an improved chemical stability is not suitable for practical use. The chemical stability of a nozzle, which prevents melting losses which could be caused by molten steel, includes the capacity of preventing the deposition of molten steel onto the superficial layer of the nozzle to increase the thickness thereof and thereby block the nozzle. In any case,the nozzle must have a chemical stability that prevents the occurrence of reactions between the nozzle and the components of the molten steel, inasmuch as these reactions would result in degeneration of the nozzle.

U.S. Pat. No. 4,069,060 is directed to an improvement in conventional $Al_2O_3$-SiC refractory material. The improved refractory material is obtained by adding pulverised $Al_2O_3$ to $Al_2O_3$SiC, which is known as refractory clay, and mixing them together, molding the mixture thus obtained, drying the resultant molded product, and finally calcining the dried product in an atmosphere of CO and $CO_2$. The final product contains 2-35% by weight of corundum and SiC.

U.S. Pat. No. 4,104,075 concerns $Al_2O_3$-SiC refractory material containing TiN (titanium nitride). This refractory material necessarily has a high thermal resistance and a high corrosion resistance, which are properties peculiar to TiN. These properties of TiN are identical with the characteristic properties of SiC. However, SiC oxidizes readily, and the properties thereof are easily lost. Therefore TiN is utilized as a component to compensate for the loss of the properties of SiC.

U.S. Pat. No. 4,210,264 concerns a nozzle of a refractory material for continuous casting, which has a second layer of a refractory material containing 70-90% by weight $ZrO_2$ formed on the outer surface of a refractory nozzle body, to increase the life of the nozzle.

SUMMARY OF THE INVENTION

The present invention relates to a nozzle of a three-component refractory consisting of high alumina, graphite, and silica, in which a void volume is set within a predetermined range to furnish the refractory nozzle with a flexibility high enough to enable the material of the nozzle to absorb the strain of thermal expansion therein, and which has a well balanced heat-insulating capability and chemical stability required to suppress the deposition of molten steel and non-metallic inclusions onto the surface of the nozzle. More particularly the invention relates to an improvement in a refractory material consisting of the above three components which is obtained by a firing at a relatively low temperature of about 900° C. so that unreacted alumina and silica remain. This was not sintered.

The present invention also concerns a newly developed high alumina-graphite-silica refractory material in which the known properties of these three components coexist.

A submerged nozzle is an example of a nozzle for continuous steel casting and this member is used to control safety and in the desired manner the pouring of molten steel from a tundish to a mold, or from a ladle to a tundish. In fact, this nozzle has the greatest influence upon the efficiency of continuous casting of high-quality molten steel.

High silica, zirconia, alumina, and graphite have been studied as materials which can be used for this purpose. The nozzle having such a large influence on the efficiency of the continuous casting of molten steel must have various and complicated properties including corrrosion resistance with respect to high-temperature molten steel, the capability of preventing the build-up of non-metallic inclusions onto the surface of the nozzle, which would block it, erosion resistance to reactions of the molten steel which would form a degenerated layer on the surface of the nozzle, heat-insulating characteristics needed to prevent the nozzle from becoming blocked when the temperature of the red-hot molten steel drops by not less than a predetermined extent, and thermal stress absorption characterictics needed to absorb the thermal expansion strains occurring due to the heat of the molten steel. No one has succeeded in improving in a balanced manner these properties necessary for a nozzle of this kind. Therefore, it is necessary that the complex properties peculiar to high silica, graphite, zirconia, and alumina are controlled in practice.

For example, conventional graphite material tends to oxidize above 800° C. When such oxidization occurs, the residual ash and clay react with each other to form a substance having a low melting point. Unless this drawback is eliminated, the intrinsic characteristics of graphite are not fully available. In addition, it is known that, in conventional graphite material in which the heat conductivity of the graphite cannot be controlled suitably, the temperature of molten steel drops a great deal, so that solidification of the molten steel or the non-metallic inclusions increases to block the nozzle.

Conventional high silica material, the hardness of which cannot be increased, is incapable of withstanding the corrosion that occurs when it is in constant contact with molten steel. In particular, high-Mn steel enlarges the opening of the nozzle. This makes it difficult to control the continuous casting operation properly and to improve the casting efficiency.

Conventional zirconia material has advantageous characteristics in the prevention of melting losses but it tends to let alumina inclusions in the molten steel be deposited on the surface thereof. This reduces the inner diameter of the nozzle, and the nozzle can easily become blocked.

High alumina has attracted the attention of metallurgists, especially in recent years, but it is poor in its ability to absorb thermal shock occurring due to the heat of the molten steel. It has a high corrosion resistance but a nozzle of this material can become blocked disproportionally to its high price. When a nozzle of high alumina is used for molten steel containing metal oxides such as iron oxide, aluminum oxide, and manganese oxide, a decomposition layer is formed on the surface thereof, and this layer comes off afterward. These problems are difficult to solve.

$Al_2O_3SiO_2$ materials are also well known but they are all materials having a combination of the properties of the above single-component materials. They have a considerable effect but they do not have a sufficient capability of preventing the nozzle from becoming blocked.

In the above example of a nozzle for continuous casting, a tundish and a mold are connected to each other to prevent the molten steel from coming into contact with air to thereby avoid the oxidation thereof. Accordingly slag is not included in the molten steel flow during the casting operation. This can prevent the molten steel from being interrupted, so that the properties of the surface of the cast product can be improved.

An object of the present invention is to provide a nozzle for continuous casting in which the various complex properties required for a nozzle of this kind are improved simultaneously to compensate for deficiencies of each of the various refractory components of the nozzle.

Another object of the present invention is to provide a nozzle in which the ratio of the sum of the volumes of open and closed pores to the volume of the fired body is limited to 0.15-0.25 so as to form internal surfaces in a three-component refractory material consisting of alumina, graphite, and silica making up the nozzle, whereby the capability of absorbing thermal shock, the heat-insulating capability and corrosion resistance of the refractory material can be maintained for a long period of time. To achieve this, the refractory material is fired but not sintered at about 900° C., preferably from 850° C. to 950° C., which is relatively low compared with sintering temperatures used in the past, to ensure that unreacted alumina and silica are left in the fired product. Since this fired product has internal surfaces, the properties of each component from the outer surface of the refractory nozzle to an inner portion thereof can be maintained the same.

Still another object of the present invention is to provide a nozzle obtained by placing a mixture of the above three components in an elastic rubber mold to shape the mixture, and then firing the molded product, for the purpose of making uniform the distribution of the open pores in the refractory material and the distribution of closed pores occurring in the open pores. The ratio of the volume of closed pores to a total void volume is preferably 6-60%, and 1-10% to the volume of the fired body.

A further object of the present invention is to provide a nozzle in which a binder consisting of polyvinyl alcohol resin or phenol resin which is capable of decomposing thermally with ease is used to improve the properties of minute cavities in the refractory material of the nozzle, at least, part of the alumina and silica remains unreacted by controlling the calcination temperature, and required minute cavities are formed in a preferable state. This refractory material permits the formation therein of minute cavities with a preferable distribution to prevent the refractory material from contracting too much when it is used in practice at temperatures higher than the calcination temperature, and controls the average diameter of closed pores, i.e. closed minute cavities not communicating with the outer surface of the refractory material, 1–3000 μm. The nozzle thus obtained inevitably has a high flexibility and heat-insulating capability, a relatively long life and an improved reliability.

The present invention has been developed by a new technical system in which a fired body (but not sintered) consisting of alumina, graphite, and silica is formed so as to have a cavity volume index (volume percentage) of 0.15–0.25. When this index is smaller, the density of the fired body is too high, so that spalling thereof occurs. When the index is above 0.30, the strength of the fired body decreases. When the index is within the above range, the elasticity of the fired body, which has an influence upon its capability of absorbing thermal expansion therein, and the heat-insulating capability thereof preventing any temperature drop in the molten steel, can be improved.

Moreover, the above three components can be distributed in a preferable state not only on the outer surface of the fired body, but also on the outer surfaces of internal cavities. This fired body has a further advantage in that the three components cooperate in a balanced manner to prevent the surface of the nozzle in contact with the molten steel from wearing out.

The above index is optionally 0.2 including 10% of closed pores. When the surface of the nozzle wears normally due to the flow of molten steel, the unreacted alumina and silica on the surfaces of the minute cavities act as a new nozzle surface while retaining their respective properties, which will be described later.

Fluidizing a pulverized substance placed in a mold by using a uniform compression density, which can be obtained only by a hydrostatic pressure method, is effective for carrying out the firing step and a later step of furnishing the molded nozzle with a predetermined cavity volume index. The nozzle thus manufactured displays excellent, balanced properties compared with nozzles of any other combination of components, owing to the surface-forming effect of the above three components.

Accordingly, a nozzle according to the present invention is free from the drawbacks encountered in a conventional nozzle of this kind, in which one of two or three components does not work effectively, or rather stops working in the system, so that the unexpected inconveniences mentioned previously occur. This new fired but not sintered body consisting of a powder of three components and characterized by its novel void volume displays an excellent corrosion resistance, which is a characteristic feature of alumina, and enables the prevention of melting losses which cause the diameter of the nozzle to increase, or corrosion thereof. The characteristics of graphite also work actively, so that the drawback encountered in a conventional nozzle in which, when the nozzle reacts with metal oxides in the molten steel, the nozzle degenerates as described above, with the degenerated layer spalling off afterward, can be eliminated. In the nozzle according to the present invention, the extensive and balanced properties preventing the occurrence of abnormal reactions seen in conventional nozzles work simultaneously. Moreover, the silica contained in the nozzle contributes to the prevention of blocking and spalling therein.

40-88% by weight of alumina powder or hollow alumina particles, 10-45% by weight of graphite powder and 2-30% by weight of silica powder, the weight percentages being based on the total weight of refractory materials used, are mixed together to obtain a powdery raw material. A suitable binder consisting of tar pitch or a synthetic resin is added to the raw material powder and is well kneaded therewith. The resultant product is granulated to obtain granules of around 0.5-1 mm.

The binder generates a decomposition gas when it is exposed to the firing temperature more than 850° C. The binder serves the purpose of forming minute closed cavities in the fired but not sintered body, i.e., it readily forms minute closed cavities of an average diameter of not more than 3000 $\mu$m. Other binders, for example, pulp sludge, water glass, molasses can be used; a preferable binder can be selected according to the availability of materials. A binder capable of decomposing easily is preferably used. Thus a three-component fired body with various properties in a balanced state can be formed. When less than 40% by weight alumina is used, the corrosion resistance of the resultant fired body tends to be lost, and an increase in the diameter of the nozzle or melting losses occur. On the other hand, when more than 89% by weight of alumina is used, it reacts with metal oxides, especially oxides of Al, Fe and Mn, so that a generated layer starts to form even when the void volume index is within the predetermined range. The separation of such a degenerated layer can occur in some cases. As the mixing ratio of alumina increases, the spalling resistance of the fired body decreases.

When the fired but not sintered body has a void volume index as defined above, the excellent characteristics of the three components thereof can be displayed. It is considered that the spalling resistance and resistance to the separation of the superficial layer of the nozzle are influenced by the quantity of graphite used. When more than 10% by weight graphite is used, the spalling resistance and resistance to separation of the superficial layer of the nozzle are improved. Since graphite has a high heat conductivity, it is preferable that the quantity of graphite used does not exceed 45% by weight. In order to prevent the nozzle from becoming blocked, it is absolutely necessary that the nozzle body has a high-insulating capability.

Even when the heat-insulating capability of the nozzle body is maintained at a required level with the quantity of graphite used controlled to be less than the upper limit, the nozzle may be blocked from another cause. In order to solve this problem, adding not more than 30% by weight of silica based on the total weight of a raw material mixture will be effective. 2-30% by weight of silica causes the resultant nozzle to have a very high spalling resistance; silica serves to provide the nozzle with excellent properties preventing it from becoming blocked. The silica used may consist of regular quartz powder, amorphous silica, or any other silica material, but molten quartz is the most effective in adding the above properties to the nozzle.

Molding a three-component mixture to obtain a fired nozzle according to the present invention having specific outer and inner surface conditions and well-balanced properties, as well as using a rubber press prior to a firing step, is part of the practical techniques used in the present invention; it is essential to the manufacture of this very useful nozzle. In particular, the fact that molding a mixture of the above raw materials by using a rubber press causes the spalling resistance of the resultant nozzle to be improved constitutes a novel industrial technique, and is worthy of special mention. The above granules are packed into a rubber press, and a static load is applied to them by it. As a result, the pulverized substances in the press receive a uniform contact pressure, so that the fluidity of the pulverized substances reaches a suitable level. Consequently, the above void volume index of 0.15-0.25 can be maintained very reliably. In a conventional casting method, coarse portions, or sometimes even cracks or cavities, are left, especially in the central portion of the material in a metal mold, i.e., it is difficult to control the fluidity of the pulverized substances in a uniform manner. This causes a difference between the bulk specific gravity of the outer portion of a product and that of the inner portion thereof. Therefore, it can be said that it is difficult to use such a conventional molding method to form a fired body having a void volume index defined as in the present invention. In a three-component fired body with a composition ratio according to the present invention, minute closed cavities having an average diameter of 1-3000 $\mu$m, which is said to be the preferable average diameter with respect to the fired body, can be easily formed. It is very important that minute closed cavities having a volume corresponding to 1-10% to the volume fired body and 6-60% to the above void index are formed in the fired body. The closed cavities formed in the fired body, mainly because of the binder which can decompose easily under 900° C. and which is added to the starting mixture, work effectively to improve the strength, thermal resistance and spalling resistance of the fired body, and thereby stabilized the physical conditions thereof.

DESCRIPTION OF THE PREFERRED EMBODIMENTS

Figure 1:
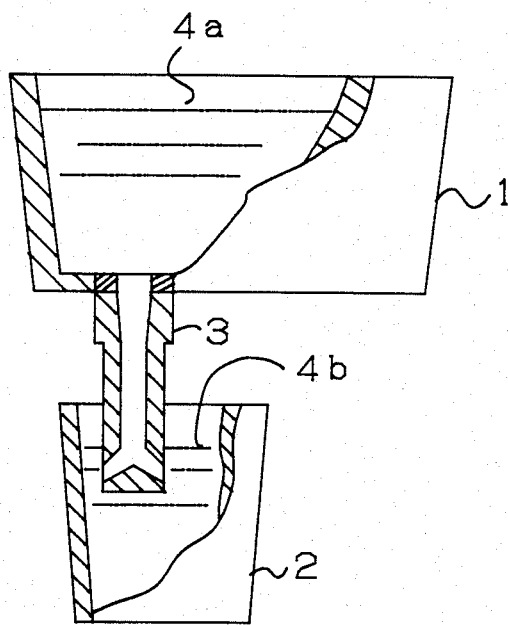
FIG. 1 is a partially cut away view in side elevation of a tundish 1, a mold 2 and a submerged nozzle 3.
Figure 2:
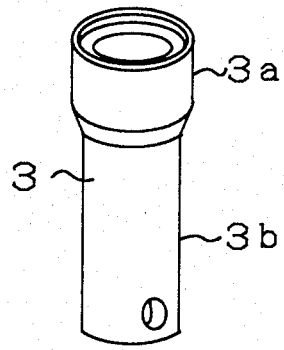
FIG. 2 is a partially cut away view in perspective of a tundish nozzle 3a and a submerged nozzle 3b used together.

A nozzle 3 for continuous steel casting, shown in FIG. 1, is used as illustrated therein, with a tundish 1 and a mold 2 connected together. Part of the nozzle is immersed in molten steel 4b in the mold 2, to which molten steel 4a in the tundish 1 is transferred. FIG. 2 shows a modified example in which a tundish nozzle 3a is connected to a submerged nozzle 3b according to the present invention. The tundish nozzle 3a is attached to an opening in the tundish 1, and the submerged nozzle 3b, which extends into the interior of a mold 2, is attached to the other end of the tundish nozzle 3a.

Examples 1-3 of the present invention will now be described with reference to their industrial values.

EXAMPLE 1

64 parts of alumina powder and 26 parts of graphite powder were first mixed, and 10 parts of silica powder and 2 parts of polyvinyl alcohol resin were added to the resultant mixture and the mass thus obtained was subjected to secondary mixing, i.e. kneading. The kneaded product was formed into granules of about 0.5 mm. The granulated product was packed in the required rubber mold and a uniform compressive force was applied thereto via the elastic rubber mold. The material in the mold was shaped by a pressure of 1000 kg/cm² applied thereto for about 5 minutes. The molded product was removed from the mold, dried, and then fired but not calcined at about 900° C. The final product had a cavity volume index of about 0.18 including 20% of closed pores, a bending strength of 152 kg/cm², a bulk specific gravity of 2.1, and a heat conductivity of 0.41 Kcal/mhr°C.

EXAMPLE 2

5 parts of molten silica were added to a primary mixture of 56 parts of alumina powder and 39 parts of natural graphite powder. 3 parts of raw tar pitch were added as a binder to the resultant mixture and the mass was well kneaded. The kneaded product was granulated. The granulated product was packed in a rubber press utilizing glycerin as a pressure liquid, and molded as the pressure increased to a peak value of 1500 kg/cm² in about 20 minutes. The molded product was dried and then fired at 950° C. The final product had a cavity volume index of 0.21 including 30% of closed pores, and the above five properties were well balanced. The bending strength, bulk specific gravity and heat conductivity of this product were 90 kg/cm², 2.7 and 0.5 Kcal/mhr°C., respectively.

EXAMPLE 3

15 parts of silica powder were added to a primary mixture of 45 parts of alumina powder and 40 parts of graphite powder, and were mixed therewith. 5 parts of phenol resin were added as a binder to the resultant mixture. The resultant mass was kneaded and then granulated. The granulated product was subjected to a molding step using a rubber press in which the pressure was increased to a peak value of 1200 kg/cm² in about 15 minutes. The molded product was dried and then fired at 850° C. The final product had a cavity volume index of 0.15 including 50% of closed pores, a bending strength of 122 kg/cm², a bulk specific gravity of 2.5, and a heat conductivity of 0.151 Kcal/mhr°C.

The products of Examples 1–3 were put to practical use as nozzles to examine the balance of the properties thereof. A conventional nozzle becomes unusable after it is used a few times in the continuous casting of high manganese steel. On the other hand, the number of usage times after which even a nozzle for the continuous casting of alumina-killed steel according to the present invention becomes unusable is several times that at which a conventional nozzle becomes unusable. Namely, a conventional nozzle becomes unusable after the continuous casting of several to 10 tons of steel, while a nozzle according to the present invention does not become unusable until the quantity of continuously cast steel has reached several tens to several hundreds of tons. In fact, a nozzle according to the present invention, in which the balance of various properties is greatly improved, enables an increase in the operating efficiency of the steel casting operation.

The melting point of silica, or the temperature at which silica melt-mixes with any chemical element, is 1720° C., and the equivalent temperature for alumina is 2030° C. The firing temperature used of about 900° C. (850°–950°) is much lower than these temperatures. This is why unreacted alumina and silica remain in the refractory material after it has been fired. Moreover, the unreacted alumina and silica are distributed on the surface of minute cavities, the volumes of which are limited to be within a certain range. When the temperature of the fired body increases, the number of opened pores decreases, and the closed minute cavities increase by corresponding relative value lower than a value of a porosity of the fired body. The above binder or a similar agent generates a decomposition gas at 300°–800° C. At temperatures of more than 1200° C., the alumina and silica start to react and the quantities of unreacted alumina and silica suddenly decrease, so that the above balanced properties of the fired product are lost. Aluminosilicates are components that corrode easily. The values of the seven properties shown in the following table prove that the present invention is very useful. The table includes data for materials A and B as reference data. The materials A and B have composition different from that of the three-component product defined in the present invention.

| | | Experiment | | | | | | |
|---|---|---|---|---|---|---|---|---|
| | | A | I | II | III | IV | V | B |
| Component ratio, wt % | SiO₂ | 3 | 15 | 10 | 5 | 15 | 25 | 35 |
| | Al₂O₃ | 92 | 45 | 64 | 56 | 50 | 50 | 15 |
| | C | 5 | 40 | 26 | 39 | 35 | 25 | 30 |
| Quantity by which binder increased, wt % | | 10 | 10 | 12 | 8 | 15 | 7 | 5 |
| kind of binder | | Phenol resin | Phenol resin | Phenol resin | Raw tar pitch | Phenol resin | tar | Phenol resin |
| Cavity volume index | | 0.1 | 0.15 | 0.18 | 0.21 | 0.23 | 0.25 | 0.3 |
| Average diameter of closed pores (μ) | | 55 | 2 | 4 | 10 | 5 | 15 | 4 |
| Bending strength (kg/cm²) | | 160 | 122 | 89 | 60 | 40 | 40 | 20 |
| Bulk specific gravity | | 2.53 | 2.45 | 2.49 | 2.30 | 2.22 | 2.15 | 2.01 |
| Heat conductivity (Kcal/mhr °C. at 300° C.) | | 0.33 | 0.47 | 0.37 | 0.45 | 0.43 | 0.30 | 0.31 |
| Ratio of number of closed pores to total number of pores | | 18 | 17 | 10 | 4 | 4 | 3 | 23 |
| Properties of nozzle | | | | | | | | |
| Corrosion resistance with respect to molten steel | | (1) | (1) | (1) | (2) | (3) | (3) | (6) |
| Erosion resistance with respect to molten steel | | (6) | (1) | (1) | (1) | (2) | (2) | (5) |
| Nozzle-blocking prevent- | | (6) | (3) | (4) | (5) | (2) | (1) | (2) |

-continued

| | Experiment | | | | | | |
|---|---|---|---|---|---|---|---|
| | A | I | II | III | IV | V | B |
| ion capability | | | | | | | |
| Mechanical strain-absorbing capability (elasticity) | (6) | (5) | (2) | (2) | (1) | (1) | (1) |
| Graphite oxidation-preventing capability | (1) | (1) | (2) | (2) | (3) | (5) | (6) |
| Spalling resistance | (6) | (4) | (3) | (2) | (1) | (1) | (1) |
| Life of nozzle used for continuous casting | (1) | (1) | (1) | (2) | (2) | (3) | (6) |
| Balance of nozzle properties | (5) | (3) | (1) | (1) | (2) | (3) | (6) |

The grading numerals in the above table represent the following:
(1): best
(2): better
(3): good
(4): bad
(5): worse
(6): worst

We claim:

1. A nozzle for continuous casting comprising a fired unsintered body having a total volume and a minute cavities volume in the range of 0.1 to 0.25 of the total volume, said minute cavities comprising 6 to 60% closed pores, said closed pores comprising 1 to 10% of the total volume of the fired unsintered body, produced by the process of adding 2 to 30% by weight of silica powder to a primary mixture of 10 to 45% by weight of graphite powder uniformly dispersed in 40 to 88% by weight of alumina powder to obtain a secondary mixture, adding 2 to 30% by weight of a binder to the secondary mixture and kneading said secondary mixture and binder to obtain a final mixture, granulating said final mixture, molding said granulated final mixture in a rubber press to form a molded product, and firing the molded product at a temperature between 850° C. and 950° C. to decompose said binder into a gas to form said fired unsintered body with said closed pores while leaving unreacted alumina and silica in said fired unsintered body on surfaces of said closed pores.

2. The nozzle according to claim 1, wherein said firing temperature is about 900° C.

3. A nozzle according to claim 1, wherein said granulated final mixture is molded in said rubber press under a pressure of 1000 kg/cm² to 1500 kg/cm² for a period of 5 to 20 minutes.

4. The nozzle according to claim 1, wherein said binder is selected from the group consisting of alcohol, a resin and a phenolic resin.

5. The nozzle according to claim 1, wherein the final mixture is granulated to granules of 0.5 to 1 mm.

6. The nozzle according to claim 1, wherein said minute cavities have a size in the range of 1 to 3000 microns.

7. The nozzle according to claim 1, wherein said minute cavities consist of open pores communicating with an outer surface of the refractory material constituting said nozzle and closed pores not communicating with said outer surface.

8. A nozzle for continuous casting molten steel comprising forming a primary mixture of 10 to 45% by weight of graphite powder uniformly dispered in 40 to 88% by weight of alumina powder, adding to said primary mixture 2 to 30% by weight of silica powder to form a secondary mixture, adding 2 to 30% by weight of a binder to the secondary mixture to thereby obtain a final mixture, granulating the final mixture to form a granulated product, molding the granulated product by the use of a rubber press to form a molded product, firing the molded product at a temperature between 850° C. and 950° C., and decomposing said binder into a gas to thereby form a fired unsintered body with closed pores while leaving unreacted alumina and silica in said fired unsintered body on surfaces of said closed pores, the fired unsintered body having a total volume and a minute cavities volume in the range of 0.1 to 0.25 of the total volume, said minute cavities comprising 6 to 60% of said closed pores, said closed pores comprising 1 to 10% of the total volume of the fired unsintered body.

* * * * *